US009621957B2

(12) United States Patent
Silyaev et al.

(10) Patent No.: US 9,621,957 B2
(45) Date of Patent: Apr. 11, 2017

(54) METHOD AND SYSTEM FOR LOW-LATENCY BROWSING ON A DEVICE WITH LIMITED PROCESSING RESOURCES (75) Inventors: Vladimir Silyaev, Laguna Niguel, CA (US); Marcus Kellerman, San Diego, CA (US); Xuemin Chen, Santa Fe, CA (US); David Erickson, San Clemente, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 685 days.

(21) Appl. No.: 12/650,140

(22) Filed: Dec. 30, 2009

(65) Prior Publication Data

US 2011/0161393 A1 Jun. 30, 2011

Related U.S. Application Data (60) Provisional application No. 61/261,780, filed on Nov. 17, 2009.

(51) Int. Cl.
*G06F 15/16* (2006.01)
*H04N 21/4782* (2011.01)
*G06F 17/30* (2006.01)
*H04N 21/233* (2011.01)
*H04N 21/2343* (2011.01)
*H04N 21/258* (2011.01)
*H04N 21/462* (2011.01)
*H04N 21/845* (2011.01)
*H04L 29/08* (2006.01)

(52) U.S. Cl.
CPC ... *H04N 21/4782* (2013.01); *G06F 17/30902* (2013.01); *H04L 67/02* (2013.01); *H04L 67/04* (2013.01); *H04L 67/28* (2013.01); *H04N 21/2335* (2013.01); *H04N 21/2343* (2013.01); *H04N 21/25825* (2013.01); *H04N 21/4622* (2013.01); *H04N 21/8456* (2013.01)

(58) Field of Classification Search
CPC .. H04N 21/4622; H04N 21/20; H04N 21/222; H04N 21/2221; H04N 21/4147; H04L 12/2836; H04L 67/02
USPC ......................................... 709/201, 202, 203
See application file for complete search history.

(56) References Cited

U.S. PATENT DOCUMENTS 6,247,013 B1 * 6/2001 Morimoto ......... G06F 17/30905
707/913
7,143,428 B1 * 11/2006 Bruck ................. H04N 5/44543
348/E5.105

(Continued)

*Primary Examiner* — Dhairya A Patel
(74) *Attorney, Agent, or Firm* — Foley & Lardner LLP (57) ABSTRACT Aspects of a method and system for low-latency browsing on a device with limited processing resources are provided. In this regard, content may be retrieved and processed by a server on behalf of a client device, and the server may communicate the processed content to the client device. In processing the content, the server may process a portion of the content that will initially be displayed in a browser window by the client before processing one or more other (e.g., remaining) portion(s) of the content. The processed portion that will initially be displayed in the browser window may be communicated to the client device while a another portion of the content is processed by the server. In this manner, a user does not have to wait for an entire web page to be processed before at least a portion of the web page is viewable in the browser window.

22 Claims, 8 Drawing Sheets (56) References Cited

U.S. PATENT DOCUMENTS

| | | | | |
|---|---|---|---|---|
| 7,487,201 B1* | 2/2009 | Murray | G06F 17/30893 | 709/201 |
| 7,490,135 B2* | 2/2009 | Klug | G06F 17/30867 | 709/203 |
| 7,640,512 B1* | 12/2009 | Appling | G06F 17/30905 | 715/760 |
| 7,653,748 B2* | 1/2010 | Borger | G06Q 30/02 | 455/414.4 |
| 7,667,719 B2* | 2/2010 | Goodwin | G06F 3/0485 | 345/173 |
| 7,770,103 B2* | 8/2010 | Hammerich | G06F 17/243 | 707/999.103 |
| 8,356,247 B2* | 1/2013 | Krassner | G06F 17/30905 | 715/234 |
| 2004/0031052 A1* | 2/2004 | Wannamaker | A63F 13/12 | 725/61 |
| 2004/0070600 A1* | 4/2004 | Morrisroe | G06F 17/3089 | 715/738 |
| 2005/0216940 A1* | 9/2005 | Black | H04N 7/163 | 725/87 |
| 2006/0101403 A1* | 5/2006 | Sharma | G06F 11/3688 | 717/124 |
| 2006/0117340 A1* | 6/2006 | Pavlovskaia | H04N 7/163 | 725/34 |
| 2006/0253799 A1* | 11/2006 | Montroy | G06F 17/3089 | 715/809 |
| 2008/0098450 A1* | 4/2008 | Wu | H04N 21/4312 | 725/132 |
| 2008/0141320 A1* | 6/2008 | McCarthy | H04N 7/17318 | 725/110 |
| 2008/0147873 A1* | 6/2008 | Matsumoto | G06F 17/30017 | 709/231 |
| 2008/0195691 A1* | 8/2008 | Kloba | H04M 1/72561 | 709/201 |
| 2008/0222242 A1* | 9/2008 | Weiss | G06F 17/30902 | 709/203 |
| 2008/0232430 A1* | 9/2008 | Batey | H04B 1/3805 | 375/130 |
| 2009/0240586 A1* | 9/2009 | Ramer | G06F 17/30905 | 705/14.64 |
| 2010/0058417 A1* | 3/2010 | Rondeau | G06F 17/30017 | 725/110 |
| 2010/0153544 A1* | 6/2010 | Krassner | G06F 17/2247 | 709/224 |
| 2010/0153836 A1* | 6/2010 | Krassner | H04L 67/22 | 715/234 |

* cited by examiner

METHOD AND SYSTEM FOR LOW-LATENCY BROWSING ON A DEVICE WITH LIMITED PROCESSING RESOURCES

CROSS-REFERENCE TO RELATED APPLICATIONS/INCORPORATION BY REFERENCE

This patent application makes reference to, claims priority to and claims benefit from U.S. Provisional Patent Application Ser. No. 61/261,780 Nov. 17, 2009. This application also makes reference to:

U.S. patent application Ser. No. 12/650,145 filed on Dec. 30, 2009;
U.S. patent application Ser. No. 12/650,141 filed on Dec. 30, 2009;
U.S. patent application Ser. No. 12/649,971 filed on Dec. 30, 2009;
U.S. patent application Ser. No. 12/650,069 filed on Dec. 30, 2009;
U.S. patent application Ser. No. 12/650,067 filed on Dec. 30, 2009;
U.S. patent application Ser. No. 12/650,020 filed on Dec. 30, 2009;
U.S. patent application Ser. No. 12/650,171 filed on Dec. 30, 2009; and
U.S. patent application Ser. No. 12/649,998 filed on Dec. 30, 2009.

Each of the above stated applications is hereby incorporated herein by reference in its entirety.

FIELD OF THE INVENTION

Certain embodiments of the invention relate to networking. More specifically, certain embodiments of the invention relate to a method and system for low-latency browsing on a device with limited processing resources.

BACKGROUND OF THE INVENTION

With the continuous growth of on-line businesses, social networks, and other on-line services and applications, a user may want a larger number of places or locations from which to access the Internet in a manner that is flexible and/or suits the user's lifestyle. Most users currently connect to the Internet using a web browser running on a personal computer. While only a portion of homes have a computer, most homes have a television, and in many instances, multiple televisions. Therefore, rather than using a computer to access the Internet, a user may find it more convenient to use the flat screen televisions and/or monitors in homes for the same purpose. To do so, a set-top-box (STB) connected to, for example, a flat screen television may be provided with web browsing software and protocols, and Internet connectivity, which may enable the user to easily access the Internet or check their electronic mail (email), for example, from a convenient and comfortable location such as their living room.

However, compared to a personal computer, a STB may be limited in its processing capabilities and/or in its compatibility with the large number of protocols and formats used on the Web. Accordingly, there may be instances in which the latency associated with rendering or displaying certain web content may be long because of the processing capabilities of the STB. Such latency could have a negative impact on the user experience.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for low-latency browsing on a device with limited processing resources, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for low latency browsing on a set-top-box. In various embodiments of the invention, content may be retrieved and processed by a server on behalf of a client device, and the server may communicate the processed content to the client device. In processing the content, the server may process a portion of the content that will initially be displayed in a browser window by the client before processing one or more other (e.g., remaining) portion(s) of the content. The processed portion that will initially be displayed in the browser window may be communicated to the client device while another portion of the content is processed by the server. In this manner, a user does not have to wait for an entire web page to be processed before at least a portion of the web page is viewable in the browser window.

Processing the content may comprise rendering the content based on one or more files retrieved from a web server. Processing the content may comprise transcoding rendered web content into one or more formats supported by the client. In this regard, the content may be transcoded into one or more web compatible image formats, web compatible video formats, and/or web compatible audio formats. The content may be processed based on a display resolution of the client and/or based on a size of the browser window. The server may retrieve the content based on a request generated by the client and the portion of the content to be initially displayed may be based on a destination anchor indicated in the request. The client device may be a set-top-box as is typically utilized for cable and satellite television.

Figure 1A:
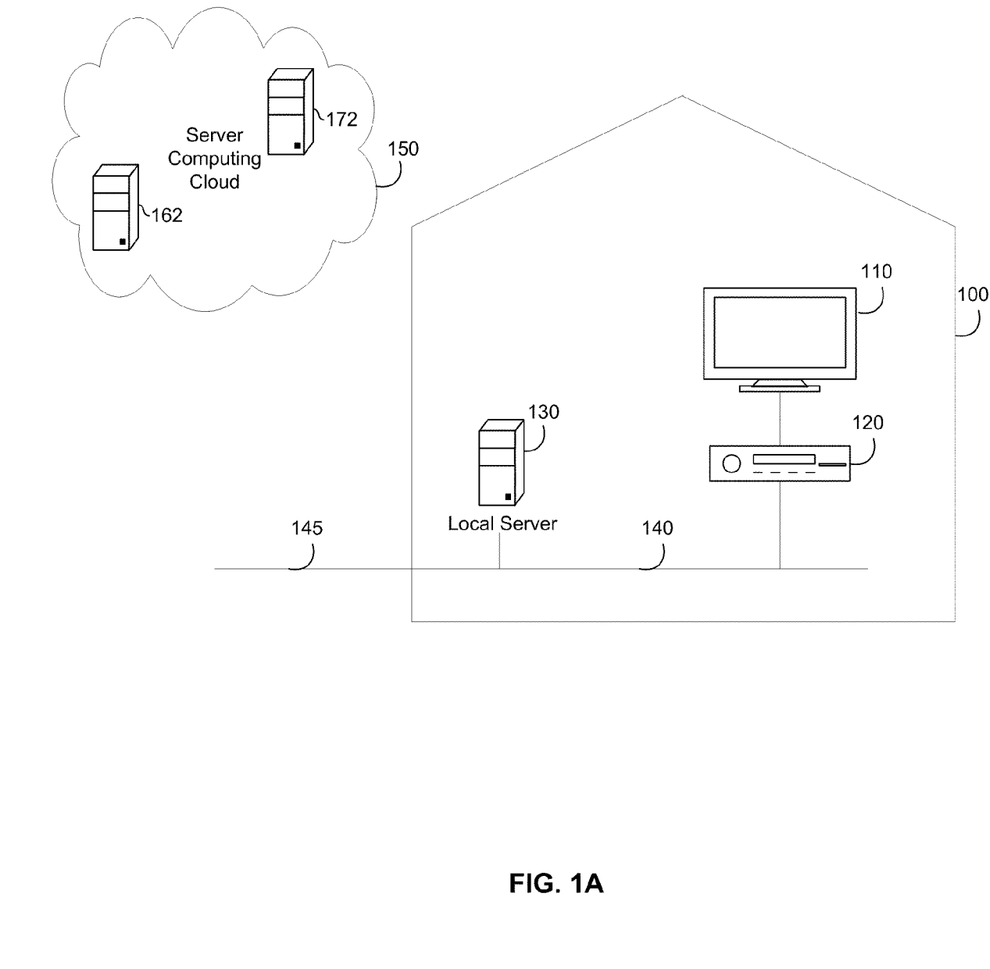
FIG. 1A is a diagram that illustrates an exemplary home or office configured to access Internet services via a set-top-box (STB), in accordance with an embodiment of the invention.

FIG. 1A is a diagram that illustrates an exemplary home or office configured to access Internet services via a set-top-box (STB), in accordance with an embodiment of the invention. Referring to FIG. 1A, there is shown a location 100 within which may be disposed a television 110, an STB 120, a local server 130, and a broadband connection 140. Also shown in FIG. 1A is a computing cloud 150 coupled to the location 100 via a broadband connection 145, a server 162 within the cloud 150, and a web server 172 within the cloud 150.

The location 100 may be a home, a business, a school, a library, and/or other like setting in which a user may want to access the Internet and/or check their electronic mail (email). The position or placement of the television set 110, the STB 120, and/or the local server 130 within the location 100 may be based on user convenience and/or lifestyle. For example, when location 100 is a home (for example, a house, an apartment), the television 110 and the STB 120 may be located in a bedroom, a family room, or an entertainment room. In another example, when location 100 is a business or a public building, the television 110 and the STB 120 may be located in a conference room. The local server 130 may be located nearby (for example, in the same room) the television set 110 and the STB 120 or may be located remotely (for example, in another room or nearby building) from the television set 110 and the STB 120. In some embodiments of the invention, the broadband connection 140 may provide a wired connection that communicatively couples two or more devices within the location 100 utilizing a coaxial cable, for example. In other embodiments of the invention, in addition to wired connectivity, a portion of the broadband connection 140 may provide a wireless connection between two or more devices within the location 100.

The television 110 may comprise suitable logic, circuitry, code, and/or interfaces that may be operable to receive signals from which to display images (for example, moving images) that are typically accompanied by sound. The television 100 may be based on, for example, cathode ray tube (CRT) technology, plasma technology, liquid crystal display (LCD) technology, and/or light emitting diode (LED) backlit LCD technology. The television 110 may be operable to support one or multiple technical standards such as digital television (DTV) and high-definition television (HDTV), for example. The resolution of the screen or display portion of the television 110 may be based on the technical standard supported by the television 110. For example, for HDTV, the resolution of the screen may be 720p, 1080i, or 1080p, where the numeral indicates the vertical resolution of the screen, the letter "p" refers to progressive-scan format, and the letter "i" refers to interlaced-scan format.

The STB 120 may comprise suitable logic, circuitry, code, and/or interfaces that may be operable to connect the television 110 to an external source of signals and to convert those signals into content that may be displayed on the screen of the television 110. The STB may be operable to provide processing associated with managing, delivering, and/or storing video content that may be displayed on the television 110.

The STB 120 may also be operable to run a web browser that may be displayed on the screen of the television 110 for user interaction. A web browser is typically a software application that may enable a user to retrieve, present, or review information resources available on, for example, the World Wide Web ("the Web"). An information resource may comprise a web page, an image, video, text, graphics, and/or other type of multimedia content, for example. A web browser may also be utilized to access information that is provided by web servers in private networks and/or files in file systems. Examples of web browsers may comprise Internet Explorer, Mozilla Firefox, Apple Safari, Google Chrome, Opera, and/or browsers that may be native or custom-made for the STB 120.

Information resources are brought to the user via the web browser when the user inputs a Uniform Resource Identifier (URI) into the web browser. In this regard, the prefix of the URI may be utilized to determine how to interpret the URI. For example, a URI that starts with "http:" may identify a resource to be retrieved over Hypertext Transfer Protocol (HTTP). Other prefixes that may be supported include "https:" for HTTP Secure (HTTPS), "ftp:" for the File Transfer Protocol (FTP), and "file:" for local files, for example. A Uniform Resource Locator (URL) is typically a subset of the URI that specifies the location where an information resource is available for retrieval and/or the mechanism for retrieval.

The local server 130 may comprise suitable logic, circuitry, code, and/or interfaces that may be operable to run or execute certain software applications that may be accessible from the STB 120 via the broadband connection 140. In this regard, the local server 130 may be operable to provide support to the web browsing operations provided by the STB 120. The local server 130 may be implemented in a computing device, comprising for example a personal computer, laptop, tablet, or in a networking device, comprising for example, a router, which may provide processing capabilities that are sufficient for performing particular software applications. For example, in instances when the local server 130 is utilized to support web browsing operations in the STB 120, the processing capabilities in the local server 130 may be sufficient to run or execute software applications that provide such support.

The server computing cloud 150 may comprise a plurality of servers and/or computing devices associated with providing various services offered by the Internet. In this regard, the term 'cloud' typically refers to the Internet and is based on the graphical depiction of the Internet as a cloud in computer network diagrams to represent the underlying infrastructure of the Internet. The servers in the server computing cloud 150 may be utilized to provide reliable services that may be delivered through individual servers and/or data centers, for example. The server computing cloud 150 may appear, to a user or to a location (for example, location 100), as a single point of access to services and/or resources that may be provided by the server computing cloud 150. The servers in the server computing cloud 150 may comprise, for example, applications servers 162 that may be dedicated to running certain software applications and/or web servers 172 in which HTTP clients connect to send commands and receive responses along with data content.

A web server 172 in the server computing cloud 150, for example, may comprise suitable logic, circuitry, code, and/or interfaces that may be operable to deliver to a client (for example, the STB 120) web pages (for example, HTML documents) and associated content (for example, images, style sheets, JavaScripts). When a client requests a specific information resource using HTTP, the web server 172 may respond by providing the content associated with that information resource. A full implementation of HTTP may enable the web server 172 to receive content from a client.

One or more servers 162 in the server computing cloud 150 that may be operable to support web browsing operations in the STB 120. In such instances, a server 162 may have processing capabilities sufficient to run or execute software applications that provide such support. The server 162 may be referred to as a render server or browsing support server, for example, to indicate that the server 162 may be operable to assist a device such as the STB 120 to render, transcode, and/or otherwise process web content. Whether a server 162 or the local server 130 is utilized to support web browsing operations in the STB 120 may depend on whether the local server 130 is present in the location 100. Additionally, whether a server 162 or the local server 130 is utilized to support web browsing operations in the STB 120 may be based, at least in part, on the amount of latency that may be acceptable to a user when having web browsing operations in the STB 120, such as the rendering of a web page, for example, be supported or assisted by another resource. In this regard, a local resource (for example, the local server 130) may have lower latency than a remote resource (for example, a server 162). Whether a server 162 or the local server 130 is utilized to support web browsing operations in the STB 120 may also depend on the processing capabilities and the type of support that may be provided. The web server 172 and the one or more servers 162 may be collocated or may be in different locations and/or owned and/or operated by different entities.

The server computing cloud 150 may connect to the location 100 via a broadband connection 145. The broadband connection 145 may provide a wired connection between the server computing cloud 150 and the broadband connection 140 in the location 100 utilizing a coaxial cable, for example. Other embodiments, however, need not be so limited. For example, the broadband connection 145 may comprise a combination of wired and wireless portions, wherein the wired portion may utilize coaxial cables, optical fibers, and/or other large bandwidth transmission medium.

In operation, a user may decide to access a web page via a web browser in the STB 120 that is being displayed in the television 110. The user may submit a URL to the web browser, which in turn sends a request for the information resource associated with that URL to a browsing support server, such as the local server 130 or a server 162. The browsing support server may, in turn, send a request to the web server 172 that hosts the requested content. In response, the web server 172 may pass the HTML and/or related content or information associated with the URL to the browsing support server. The browsing support server may then begin processing the content for communication to the STB 120.

The processing may comprise, for example, rendering and/or transcoding of the content. How the content is processed by the browsing support server, and the order in which the content is processed, may depend on the display settings of the STB 120 and/or the television 110. In this regard, the browsing support server may process the content based on the resolution being output by the STB 120 to the television 110, and based on the size of the browser window in which the content is to be displayed. In various embodiments of the invention, the rendered and/or transcoded content may be formatted in accordance with one or more image, audio, and/or video formats supported by the STB 120 and communicated to the STB 120 in such a format. Exemplary formats comprise web compatible image formats such JPEG, GIF, and PNG; web compatible video formats such as AVI, MPEG, Windows Media, QuickTime, RealVideo, and Flash; and web compatible audio formats such as MIDI, WAVE, MP3, and H.264/AAC.

Rendering the content based on the resolution being output by the STB 120 may improve the user experience by, for example, enabling the content to be displayed on the television 110 without the need for horizontal scrolling. In this regard, if the content is text, then horizontal scrolling may be merely an annoyance, but for a picture or video, the inability to see the whole image at one time may be unacceptable and/or not visually pleasing in terms of user experience.

Rendering the content based on the size of the browser window may improve the user experience by reducing the perceived latency between requesting the content and viewing the content. In this regard, the browsing support server may render the portion of the content to be initially displayed in the browser window before rendering the remaining portion or portions of the content. In this manner, while the first portion is being communicated to the STB 120 and is first being viewed by the user, the remaining portion or portions of the content may be rendered by the browsing support server.

In various embodiments of the invention, additional portions outside the current viewing area of the browser window may be rendered during the initial rendering. In this manner, the initial portion communicated to the STB 120 may allow for some scrolling by the user while the remaining portion(s) of the content is being rendered and communicated to the STB 120. In such embodiments of the invention, the amount of additional content that is outside the current browsing window being rendered may depend on factors such as how much latency can be tolerated without critically impairing the user experience, how long the content takes to render, and/or the latency in communicating the content to the STB 120.

The display settings of the STB 120, television 110, and/or browser window may be determined via any of a variety of techniques. For example, upon start-up or upon a change in a display setting, the STB 120 may send the display settings to the browsing support server. Other possibilities comprise, the browser including the display settings in requests sent by the browser, and/or the browsing support server may detect the display settings using JavaScript, PHP, and/or some other suitable scripting and/or programming language.

Although various aspects of the invention are described with respect to a set-top-box, the invention is not so limited. In this regard, aspects of the invention may be employed to improve the web browsing experience for any networking device that has limited processing capability and/or limited available resources. For example, aspects of the invention may be utilized to improve the browsing experience on mobile devices such as smart phones and personal media players. For another example, the televisions 110 itself may be enabled for network communications and web browsing without the need of a STB.

Figure 1B:
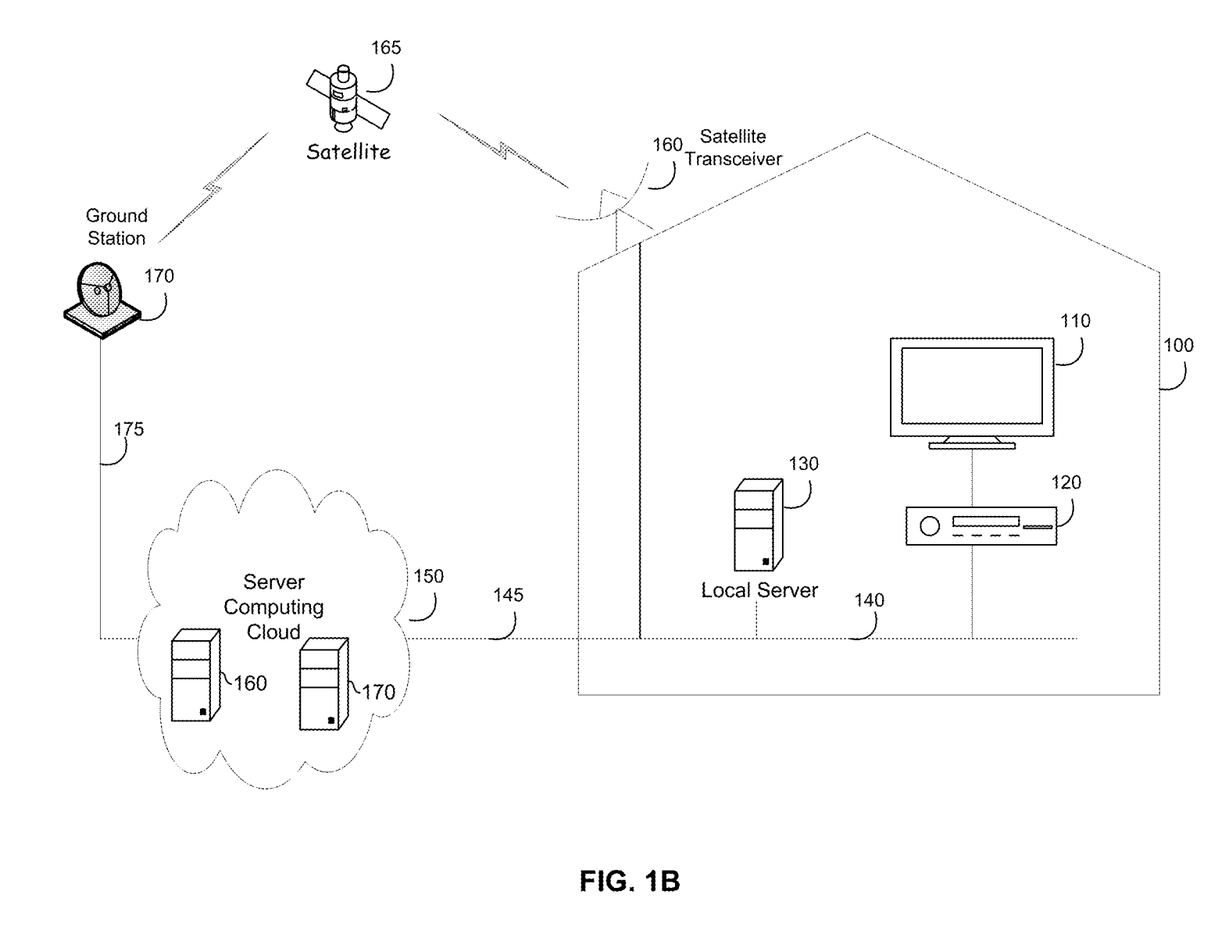
FIG. 1B is a diagram that illustrates another exemplary home or office configured to access Internet services via an STB, in accordance with an embodiment of the invention.

FIG. 1B is a diagram that illustrates another exemplary home or office configured to access Internet services via an STB, in accordance with an embodiment of the invention. Referring to FIG. 1B, there is shown the location 100, the television 110, the STB 120, the local server 130, the broadband connections 140 and 145, and the server computing cloud 150 described above with respect to FIG. 1A. Also shown in FIG. 1B are a ground station 170 communicatively coupled to the server computing cloud 150 via a broadband connection 175, a satellite 165, and a satellite receiver 160 coupled to the location 100. The satellite receiver 160 may be operable to communicate with the STB 120 via the broadband connection 140 in the location 100.

The ground station 170, the satellite 165, and the satellite receiver 160 may be operable to enable the STB 120 to communicate with a server 162 in the server computing cloud 150 that may be operable to provide web browsing support to the STB 120 and/or with a web server 172 from which web page information may be retrieved, for example. The ground station 170 and/or the satellite 165 shown in the location 100 are illustrated only as an exemplary configuration. Other configurations for the location 100 may be applied without departing from the scope of the present invention. For example, a different or the same configuration for the location 100 may be implemented to deliver television programs and/or broadband Internet to, for example, a vestigial sideband broadcast (VSB) off-air STB and/or a cable STB.

In operation, requests from the STB 120 to a remote resource (for example, a server 162 in the server computing cloud 150) for support in processing web content may be communicated via the broadband connection 145 and/or via the wireless links associated with the ground station 170, the satellite 165, and the satellite transceiver 160, and the broadband connection 175. Similarly, processed content may be communicated from the browsing support server to the STB 120 via the broadband connection 145 and/or via the wireless links associated with the ground station 170, the satellite 165, and the satellite transceiver 160.

Figure 1C:
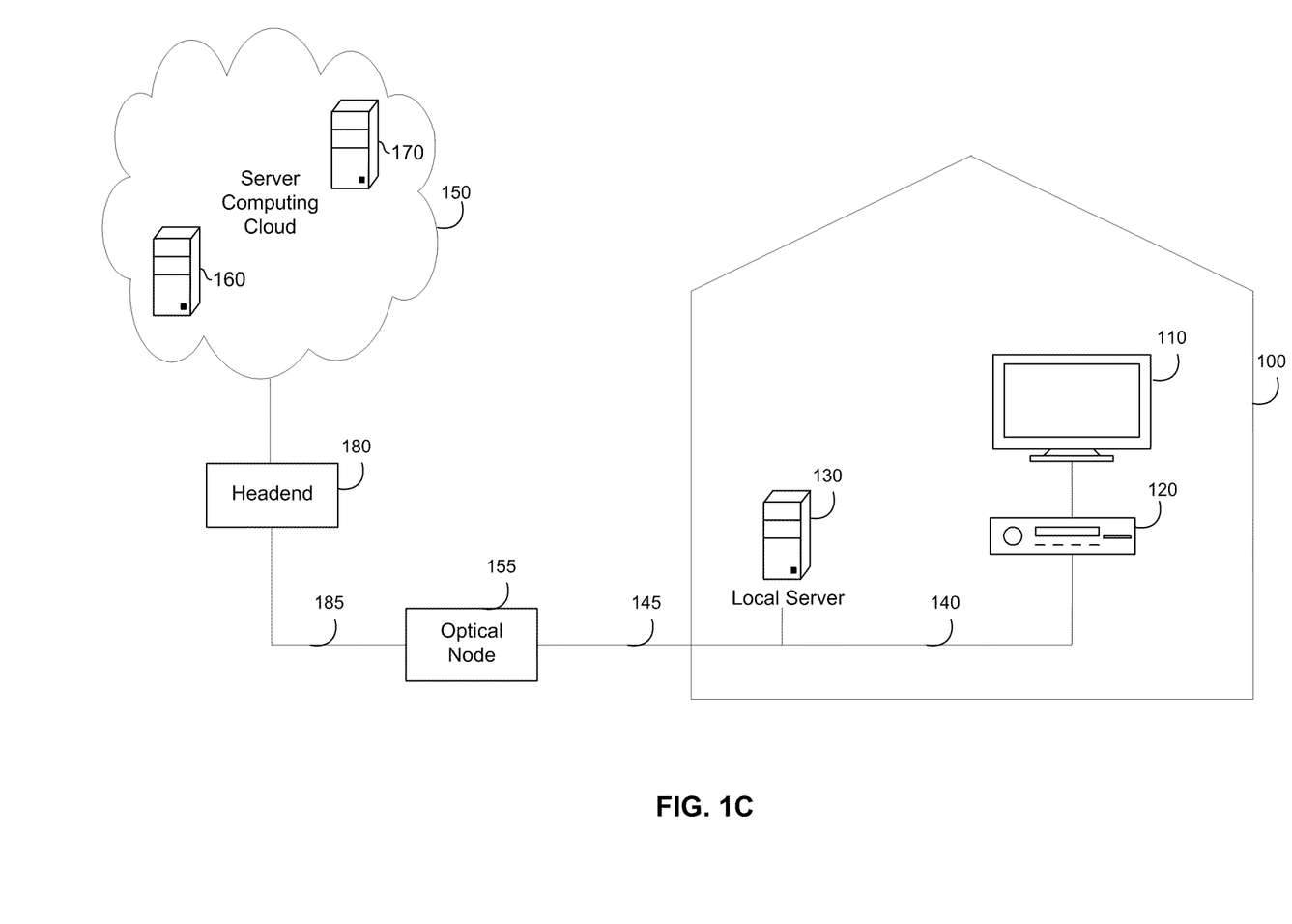
FIG. 1C is a diagram that illustrates yet another exemplary home or office configured to access Internet services via an STB using a switched digital video (SDV) scheme, in accordance with an embodiment of the invention.

FIG. 1C is a diagram that illustrates another exemplary home or office configured to access Internet services via an STB using a switched digital video (SDV) scheme, in accordance with an embodiment of the invention. Referring to FIG. 1C, there is shown the location 100, the television 110, the STB 120, the local server 130, the broadband connections 140 and 145, and the server computing cloud 150 described above with respect to FIG. 1A. Also shown in FIG. 1C, are a headend 180 communicatively coupled to the server computing cloud 150. Moreover, there is shown an optical node 155 in which one end is communicatively coupled to the headend 180 via a broadband connection 185 (for example, fiber optical link) and another end is communicatively coupled to the location 100 via the broadband connection 145 (for example, coaxial cable).

The headend 180, the broadband connection 185, and the optical node 155 may be utilized to provide a SDV scheme. In such a scheme, content for unwatched channels in a typical cable television system need not be sent and, thus, the available bandwidth may be increased. The unused channels in the broadband connection 185 may now be used by the STB 120 to communicate with a server 162 that may be operable to provide browsing support to the STB 120. Since the channel may be dedicated to such communication between the STB 120 and the server, the web browsing support may be provided with low latency. In such an embodiment of the invention, utilizing a remote resource (a server 162, for example) with large processing capabilities may be more suitable in certain circumstances than utilizing a local resource (the local server 130, for example) that may have more limited processing capabilities.

In operation, the STB 120 may utilize an unused broadcasting channel to establish a dedicated channel for communicating with a server 162 that provides web browsing support to the STB 120. Data from the server 162 may be sent to the STB 120 through the dedicated channel. Once the support from the server 162 is no longer needed, the channel may be released from the headend 180 and may become available for the transmission of television programming, for example.

Figure 2:
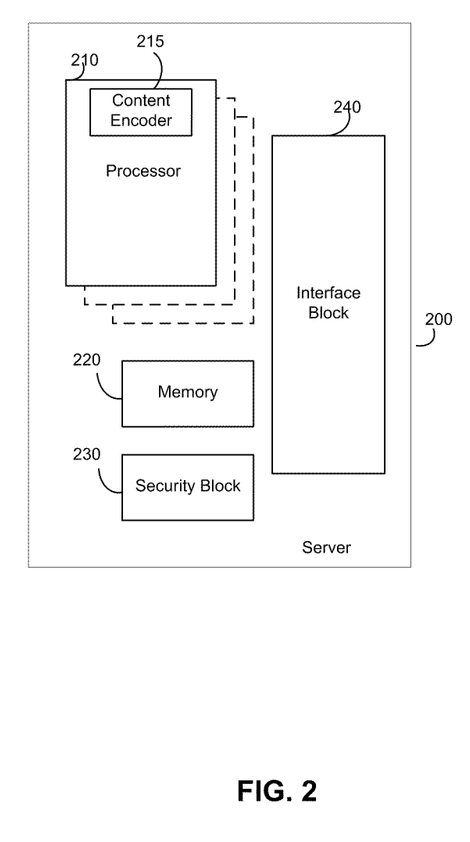
FIG. 2 is a block diagram that illustrates an exemplary server that provides browsing support to a web browser of an STB, in accordance with an embodiment of the invention.

FIG. 2 is a block diagram that illustrates an exemplary server that provides browsing support to a web browser of an STB, in accordance with an embodiment of the invention. Referring to FIG. 2, there is shown a server 200 that may comprise a processor 210, a content encoder 215, a memory 220, a security block 230, and an interface block 240. The content encoder 215 may be optional.

In some embodiments, the server 200 may correspond to the local server 130 and may be operable to provide web browsing support to the STB 120 described above, for example. In other embodiments, the server 200 may correspond to a server 162 in the server computing cloud 150 that may be operable to provide web browsing support to the STB 120.

The processor 210 may comprise suitable logic, circuitry, code, and/or interfaces that may be operable to process requests from the STB 120 to process web content and communicate the content to the STB 120 in a format supported by the STB 120. In this regard, the processor 210 may be operable to convert and/or transcode content from one format into another format. For example, the processor 210 may be operable to process plug-ins unsupported by the web browser in the STB 120 and may encode such processed plug-ins with a low latency H.264/ACC encoder. The processor 210 may comprise a plurality of different encoders that may be utilized to encode different types of contents from a web page into different formats, for example.

The content encoder 215 may comprise suitable logic, circuitry, interfaces and/or code that may be operable to transform data processed by the processor 210 into format supported by the STB 120.

In some embodiments of the invention, the processor 210 may comprise an x86-based architecture that may support processing of, for example, certain plug-ins developed or coded for execution in an x86-based processor architecture. In other embodiments, the server 200 may be operable to provide an emulator of the x86-based processor to process certain content unsupported by the STB 120.

The server 200 may comprise a plurality of processors 210, as indicated by the dashed outlines illustrated in FIG. 2. A single server 200 may be operable to support a plurality of STBs 120. In such instances, the server 200 may be operable to provide load balance and/or load sharing capabilities.

The memory 220 may comprise suitable logic, circuitry, code, and/or interfaces that may be operable to store information associated with the operation of the processor 210. The memory 220 may be operable to store information (for example, coefficients, tables) associated with the encoding operations supported by the processor 210.

The security block 230 may comprise suitable logic, circuitry, code, and/or interfaces that may be operable to support authentication operations, certificate usage, and/or cryptographic operations that may be utilized to provide secure connections between the server and the STB 120, for example.

The interface block 240 may comprise suitable logic, circuitry, code, and/or interfaces that may be operable to enable the server 200 to communicate with the STB 120 and/or with a web server 172 from which web page information may be obtained, for example. The interface block 240 may support a plurality of physical and/or logical connections or interfaces. When the server 200 corresponds to the local server 130 described above, the interface block 240 may support communication with the STB 120 via the broadband connection 140 (coaxial cable, for example).

In operation, the server 200 may receive a request from the STB 120, send a corresponding request to the corresponding web server 172, process the content received from the web server 172 such that it is rendered and/or transcoded to a format supported by the STB 120, and communicate the processed content to the STB 120. The STB 120, in turn, decodes the processed content and displays it in the browser window.

In some embodiments of the invention, when the content that may need to be processed in the server 200 is secure content, the server 200 and the STB 120 may need to perform a two-way authentication operation before establishing a secure link between them and having the STB 120 share credentials with the server 200.

Figure 3:
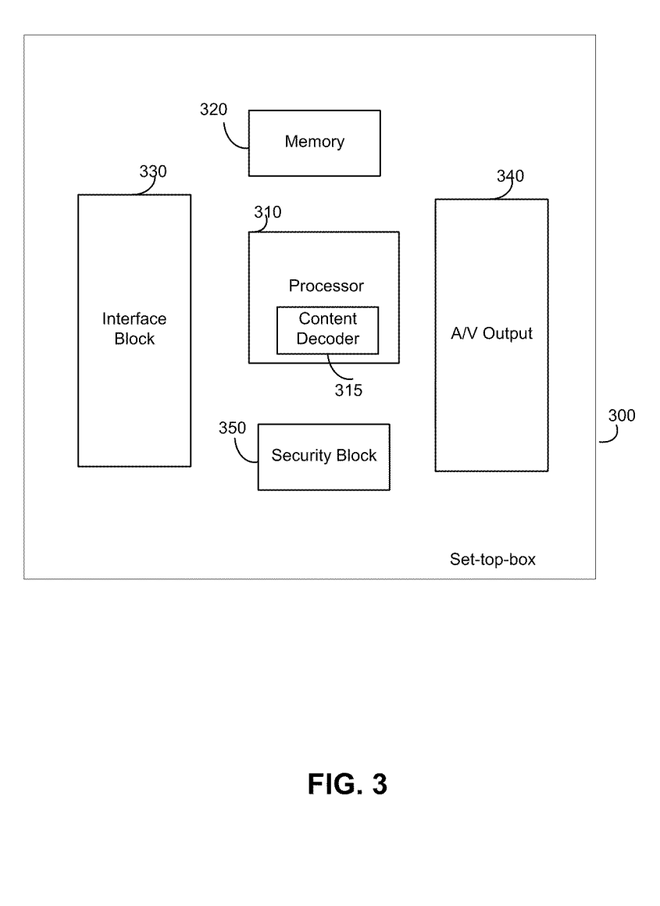
FIG. 3 is a block diagram that illustrates an exemplary STB that enables a user of the STB to access Internet services, in accordance with an embodiment of the invention.

FIG. 3 is a block diagram that illustrates an exemplary STB that enables a user of the STB to access Internet services, in accordance with an embodiment of the invention. Referring to FIG. 3, there is shown an STB 300 that may comprise a processor 310, a memory 320, a security block 350, an interface block 330, and an A/V output 340. In some embodiments, two or more of the components of the STB 300 may be integrated into a single chip.

The processor 310 may comprise suitable logic, circuitry, code, and/or interfaces that may be operable to provide processing associated with managing, delivering, and/or storing video content that may be displayed on, for example, the television 110 described above. The processor 310 may also be operable to run or execute a web browser that may be displayed on the screen of the television 110 for user interaction.

The processor 310 may be operable to send requests for web content to a server that is operable to provide web browsing support to the STB 300. The processor 310 may be operable to receive processed web content from such server and display the processed web content in a web browser window.

The content decoder 315 may comprise suitable logic, circuitry, interfaces and/or code that may be operable to transform data encoded by the local server 130 or the server computing cloud 150 into a desired format for display.

The memory 320 may comprise suitable logic, circuitry, code, and/or interface that may be operable to store information associated with the operation of the processor 310.

The security block 350 may comprise suitable logic, circuitry, code, and/or interfaces that may be operable to support authentication operations, certificate usage, and/or cryptographic operations that may be utilized to provide a secure connection between a server, which may be operable to provide web browsing support to the STB 300, for example.

The interface block 330 may comprise suitable logic, circuitry, code, and/or interfaces that may enable the STB 330 to interface with a plurality of devices, including web servers 172 and/or one or more browsing support servers, such as the servers 130 and 162. For example, the interface block 330 may support connections with cable TV services and/or satellite services. The interface block 330 may support multiple ports such as High-Definition Multimedia Interface (HDMI), Ethernet Physical Layer (PHY), Universal Serial Bus (USB), and RS232, for example. Other types of connections, protocols, and/or ports may also be supported.

The A/V output 340 may comprise suitable logic, circuitry, code, and/or interfaces that may be operable to provide audio and/or video content for display or reproduction to, for example, the television 110 described above. In this regard, the A/V output 340 may support multiple technical standards such as DTV and HDTV, and/or multiple screen resolutions.

In operation, a web browser may be run on the STB 300 and may be displayed in a television, for example television 110, via the A/V output 340. When a user interacts with the web browser, for example via a set-top-box remote control or keyboard, and submits a URL to the web browser, the STB 300 may send a request to a browsing support server via the interface block 330. The browsing support server 130, 162 may, in turn, send a request for the information resource associated with that URL to a web server 172. The web server 172 may pass the HTML and/or related content or information associated with the URL to the browsing support server 130, 162. The browsing support server may process the content and communicate the content to the STB 120 via the interface block 330. The processor 310 in the STB 300 may decode the processed content and display the content in the web browser window on the television 110 via the A/V output 340.

Figure 4:
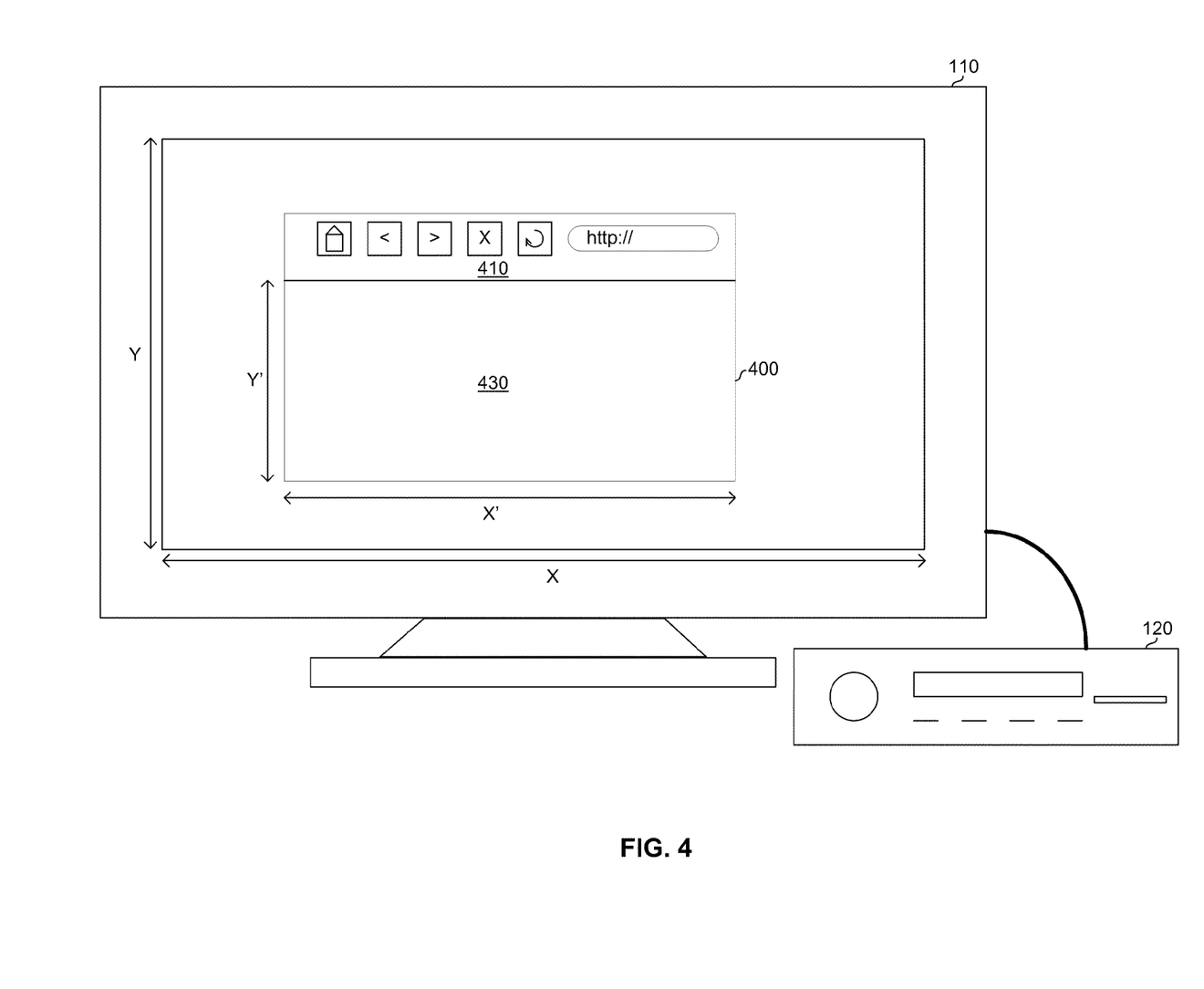
FIG. 4 is a diagram that illustrates a web browser displayed on a television, in accordance with an embodiment of the invention.

FIG. 4 is a diagram that illustrates a web browser displayed on a television, in accordance with an embodiment of the invention. Referring to FIG. 4 there is shown a web browser window 400 displayed on the television 110 by a STB 120.

The television 110 may comprise X columns of pixels and Y rows of pixels. For example, the television display may have 1920 columns and 1280 rows. The web browser window 400 may comprise a toolbar 410 that comprises user interface elements (for example, back, forward, reload, stop, home) that may be utilized for navigation and/or operation, and a display region 430 in which the web content is displayed. The display region 430 of the browser window 400 may comprise X' columns of pixels and Y' rows or pixels. In this regard, the display region 430 may be variable, sized by a user, and may have up to X columns and Y rows for "full screen" viewing. In various embodiments of the invention, the STB 120 may be operable to communicate X, Y, X', and Y' to a browsing support server.

Figure 5:
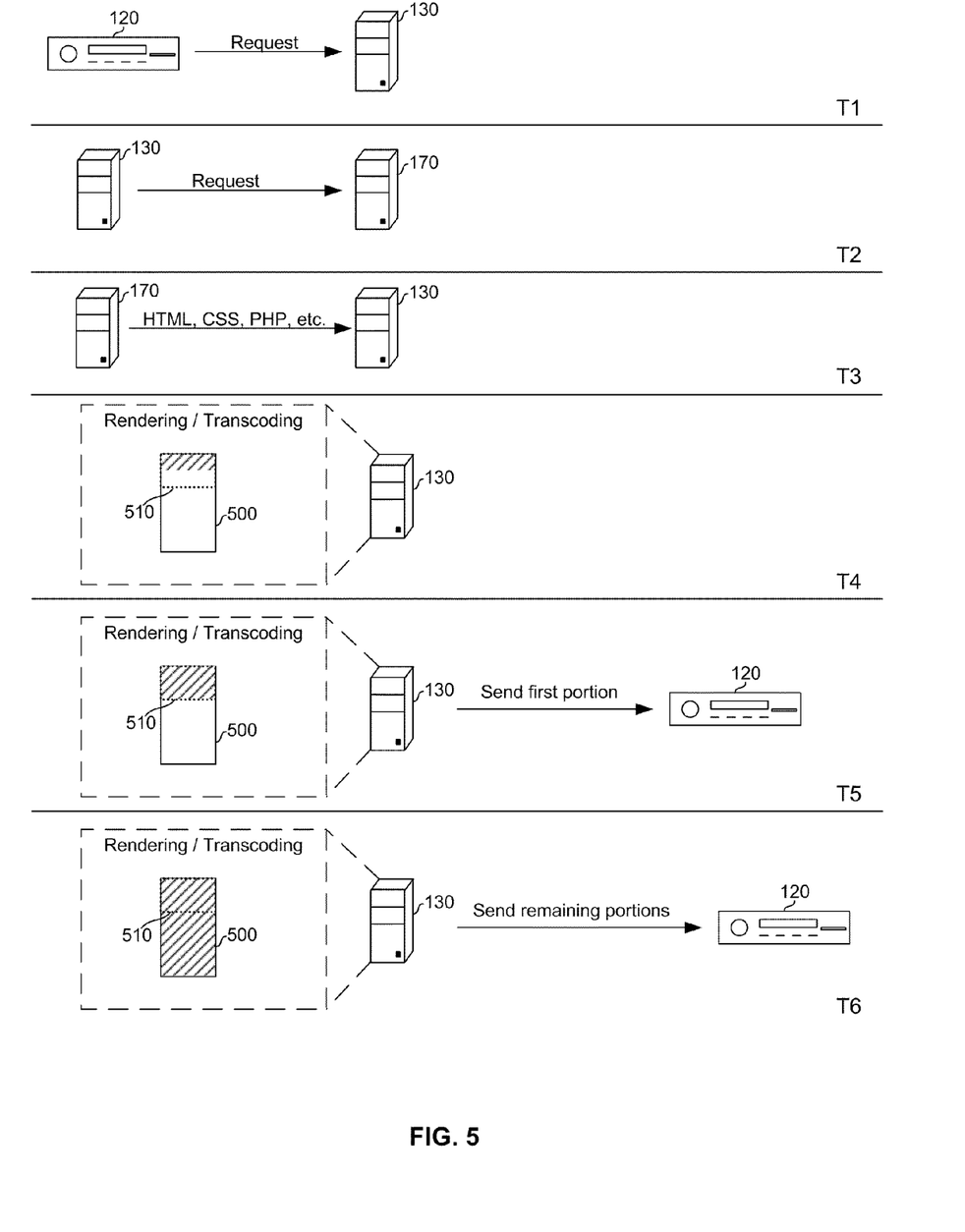
FIG. 5 is diagram that illustrates exemplary retrieving web content on a STB, in accordance with an embodiment of the invention.

FIG. 5 is a diagram that illustrates exemplary retrieving web content on a STB, in accordance with an embodiment of the invention. Referring to FIG. 5, at time instant T1, the STB 120 may send a request for a web page to the server 130. Subsequently, at time instant T2, the server 130 may send a corresponding request for the web page to the web server 172. Subsequently, at time instant T3, the web server 172 may respond by communicating the requested web page to the server 130. In this regard, the page may be communicated to the server 130 in the form of various files which may be processed to generate the web page. In this regard, the content may be communicated in the form of HTML files, CSS files, PHP files, JavaScript, image files, video files, audio files, etc.

Subsequently, at time instant T4, the server 130 may begin processing the files received from the web server 172 to render the web page. Additionally, in some embodiments of the invention, the server 130 may begin transcoding the rendered web page into a format supported by the STB 120. The server 130 may process the web page by beginning with the portion, indicated by the dashed line 510, that will initially be displayed in the display region 430 of the browser window 400 (FIG. 4). In this regard, in FIG. 5, the hashed portion of the web page 500 indicates the portion of the web page 500 that has been rendered, transcoded, and/or otherwise processed by the server 130.

Subsequently, at time instant T5, the server 130 may have completed processing the portion of the web page 500 that is to be initially displayed in the display region 430. Accordingly, at time instant T5, the processed portion of the web page 500 may be sent to the STB 120. In parallel with this communication, the server 130 may continue processing the remaining portion(s) of the web page 500. Subsequently, at time instant T6, the server 130 may finish processing the remaining portion(s) of the web page 500 and may send that processed portion to the STB 120. In this regard, although the web age 500 is shown as being transmitted in 2 portions, the invention need not be so limited, and the web page 500 may be sent in any number of transmissions as may be appropriate to achieve desired latency vs. overhead associated with each communication.

Although FIG. 5 illustrates the common situation in which the portion of the web page 500 to be initially displayed is the top of the web page, the invention is not so limited. For example, when a user of the STB 120 clicks a hyperlink or types a URI into the web browser, a request may be generated and sent to the server 130. The request may point to a destination anchor that is located in the middle of a web page 500. Accordingly, the server 130 may begin processing a portion of the web page 500 in which the destination anchor is located. That is, an interior portion of the web page 500 may be processed by the server 130 before the beginning portion and end portions of the web page 500 are processed by the server 130.

Figure 6:
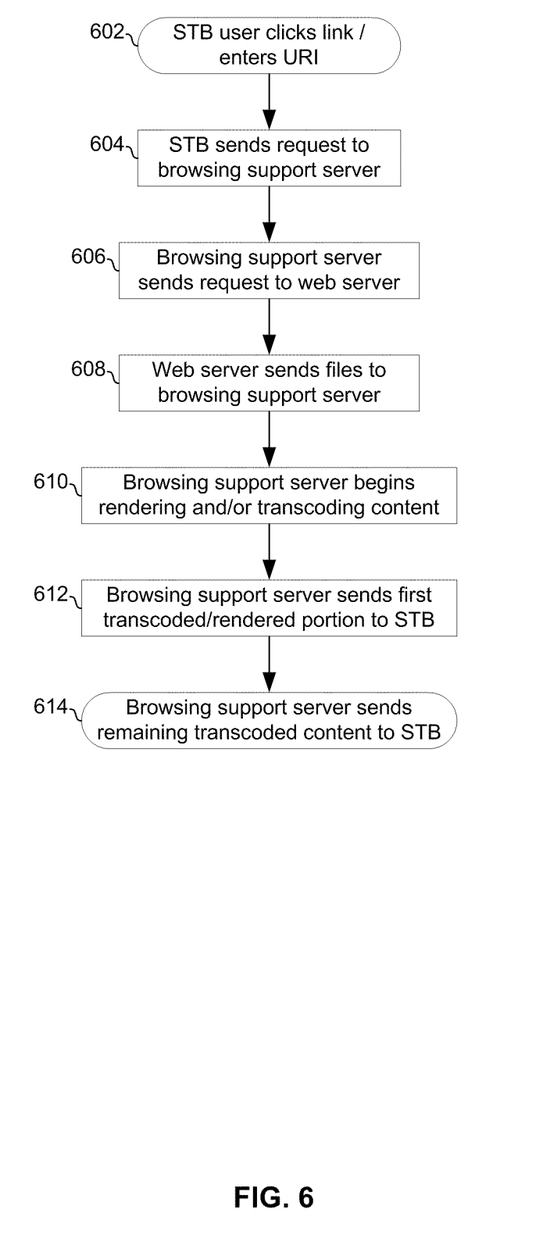
FIG. 6 is a flow chart illustrating exemplary steps for browsing on a set-top-box with the aid of a browsing support server, in accordance with an embodiment of the invention.

FIG. 6 is a flow chart illustrating exemplary steps for browsing on a set-top-box with the aid of a browsing support server, in accordance with an embodiment of the invention. Referring to FIG. 6, the exemplary steps may begin with step 602 when a user of the STB 120 may request the web page 500. In step 604, the STB 120 may send a request for the web page 500 to the server 162. In step 606, the server 162 may send a request for the web page 500 to the web server 172. In step 608, the web server 172 may respond by sending files associated with the web page 500 to the server 162. In step 610, the server 162 may begin processing the files to render the web page 500 and/or begin transcoding the files and/or rendered content into a form supported by the STB 120. In step 612, upon completion of the rendering and/or transcoding of a first portion of the web page 500—a portion that corresponds to the portion to be initially displayed in a web browser of the STB 120—the server 162 may send the first portion to the STB 120. In parallel with this communication, the server 162 may continue rendering and/or transcoding the web page 500. In step 614, upon completion of the rendering and/or transcoding of a remaining portion(s) of the web page 500, the rendered and/or transcoded remaining portion(s) of the web page 500 may be communicated to the STB 120.

Various aspects of a method and system for low-latency browsing on a set-top-box. In an exemplary embodiment of the invention, a web page 500 (FIG. 5), may be retrieved and processed by a server 130 or 162 on behalf of the STB 120, and the server 130 or 162 may communicate the processed web page 500 to the client device 120. In processing the web page 500, the server 130 or 162 may process the portion 510 of the web page 500 that will initially be displayed in the browser window 400 before processing remaining portion(s) of the web page 500. The processed portion 510 that will initially be displayed in the browser window 400 may be communicated to the STB 120 while a remaining portion or portions of the web page 500 is processed by the server 130 or 162. In this manner, a user does not have to wait for the entire web page 500 to be processed before at least a portion of the web page 500 is viewable in the browser window 400.

Processing the web page 500 may comprise rendering the web page 500 based on one or more files retrieved from a web server 172. Processing the web page 500 may comprise transcoding rendered web content into one or more formats supported by the STB 120. In this regard, the content may be transcoded into one or more web compatible image formats, web compatible video formats, and/or web compatible audio formats. The web page 500 may be processed based on a display resolution of the STB 120 and/or based on a size of the browser window 400. The server 130 or 162 may retrieve the web page 500 based on a request generated by the STB 120 and the portion 510 of the web page 500 to be initially displayed may be based on a destination anchor indicated in the request, and the location of the destination anchor in the web page 500.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for low-latency browsing on a device with limited processing resources.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
performing by one or more circuits, one or more processors, or any combination thereof in a network device:
retrieving content for display in a browser window of a client device, the retrieved content including a first partial portion that is initially displayed in said browser window and additional portions that may be subsequently displayed in said browser window; and
processing said first partial portion of said retrieved content by said network device before said additional portions of said retrieved content are processed;
communicating said processed first partial portion of said retrieved content to said client device; and
concurrent with said communication of said processed first partial portion of said retrieved content to said client device, processing a second partial portion included in said additional portions of said retrieved content by said network device in anticipation of being viewed in said browser window and before said additional portions are communicated to said client device.

2. The method according to claim 1, wherein said processing of said retrieved content comprises rendering said retrieved content based on one or more files retrieved from a web server.

3. The method according to claim 1, wherein said processing of said retrieved content comprises transcoding rendered web content into one or more formats supported by said client device.

4. The method according to claim 3, wherein said retrieved content is transcoded into one or more web compatible image formats.

5. The method according to claim 3, wherein said retrieved content is transcoded into one or more web compatible video formats.

6. The method according to claim 3, wherein said retrieved content is transcoded into one or more web compatible audio formats.

7. The method according to claim 1, comprising processing said retrieved content based on a display resolution of said client device.

8. The method according to claim 1, wherein said retrieved content is retrieved based on a request generated by said client device.

9. The method according to claim 8, wherein said first partial portion of said retrieved content is based on a destination anchor indicated in said request.

10. The method according to claim 1, wherein said client device is a set-top-box.

11. A system for networking, the system comprising:
one or more circuits, one or more processors, or any combination thereof in a network device, said one or more circuits, said one or more processors, or said combination thereof being operable to:
retrieve and process content on behalf of a client device, the retrieved content including an initial display portion that is initially displayed in a browser window by said client device and additional portions that may be subsequently displayed in said browser window; and
communicate said processed content to said client device, wherein:
said initial display portion of said retrieved content is processed by said network device before any additional portions of said retrieved content are processed;
said processed initial display portion of said retrieved content is communicated to said client device; and
concurrent with said communication of said processed initial display portion of said retrieved content to said client device, at least one of said additional portions of said retrieved content is processed by said network device in anticipation of being viewed in said browser window and before said additional portions are communicated to said client device.

12. The system according to claim 11, wherein said processing of said retrieved content comprises rendering said retrieved content based on one or more files retrieved from a web server.

13. The system according to claim 11, wherein said processing of said retrieved content comprises transcoding rendered web content into one or more formats supported by said client device.

14. The system according to claim 13, wherein said retrieved content is transcoded into one or more web compatible image formats.

15. The system according to claim 13, wherein said retrieved content is transcoded into one or more web compatible video formats.

16. The system according to claim 13, wherein said retrieved content is transcoded into one or more web compatible audio formats.

17. The system according to claim 11, wherein said one or more circuits, said one or more processors, or said combination thereof are operable to process said retrieved content based on a display resolution of said client device.

18. The system according to claim 11, wherein said one or more circuits, said one or more processors, or said combination thereof are operable to process said retrieved content based on a size of said browser window.

19. The system according to claim 11, wherein said retrieved content is retrieved based on a request generated by said client device.

20. The system according to claim 19, wherein said initial display portion of said retrieved content is based on a destination anchor indicated in said request.

21. A method for networking, the method comprising:
performing by one or more circuits, one or more processors, or any combination thereof in a network device:
retrieving content from a web server based on a request received from a client device, the retrieved content including a first portion that is initially displayed in a browser window by said client device and a remaining portion that may be subsequently displayed in said browser window;
processing said first portion of said retrieved content;
communicating said processed first portion of said retrieved content to said client device;
concurrent with said communication of said processed first portion of said retrieved content to said client device, processing said remaining portion of said retrieved content in anticipation of being viewed in said browser window and before any other portions of said retrieved content are communicated to said client device; and communicating said processed remaining portion of said retrieved content to said client device for display in said browser window.

22. The method of claim 21, wherein said network device is a local server.

* * * * *